United States Patent
Lehrer

(10) Patent No.: US 9,665,905 B2
(45) Date of Patent: May 30, 2017

(54) THREE DIMENSIONAL SHOPPING CART

(76) Inventor: Matthew Lehrer, Carlsbad, CA (US)

(*) Notice: Subject to any disclaimer, the term of this patent is extended or adjusted under 35 U.S.C. 154(b) by 31 days.

(21) Appl. No.: 13/590,551

(22) Filed: Aug. 21, 2012

(65) Prior Publication Data

US 2014/0058885 A1 Feb. 27, 2014

(51) Int. Cl.
*G06Q 30/00* (2012.01)
*G06Q 30/06* (2012.01)

(52) U.S. Cl.
CPC ........ *G06Q 30/0641* (2013.01); *G06Q 30/06* (2013.01); *G06Q 30/0601* (2013.01); *G06Q 30/0623* (2013.01); *G06Q 30/0625* (2013.01); *G06Q 30/0627* (2013.01); *G06Q 30/0629* (2013.01); *G06Q 30/0633* (2013.01); *G06Q 30/0643* (2013.01)

(58) Field of Classification Search
CPC ............ G06Q 30/0601–30/0645; G06Q 30/08
USPC ................................................ 705/26.1–27.2
See application file for complete search history.

(56) References Cited

U.S. PATENT DOCUMENTS

| | | | | |
|---|---|---|---|---|
| 6,292,827 B1* | 9/2001 | Raz | | 709/217 |
| 6,922,815 B2* | 7/2005 | Rosen | | 715/782 |
| 7,680,694 B2* | 3/2010 | Glazer et al. | | 705/26.43 |
| 8,069,096 B1* | 11/2011 | Ballaro | | G06Q 10/087 705/27.2 |
| 2006/0206512 A1* | 9/2006 | Hanrahan et al. | | 707/102 |
| 2007/0192203 A1* | 8/2007 | Di Stefano | | 705/26 |
| 2009/0064009 A1* | 3/2009 | Krantz et al. | | 715/764 |
| 2009/0138817 A1* | 5/2009 | Oron et al. | | 715/788 |
| 2010/0315417 A1* | 12/2010 | Cho et al. | | 345/419 |
| 2012/0054622 A1* | 3/2012 | Nankani | | G06F 3/04815 715/730 |
| 2012/0221433 A1* | 8/2012 | Plattsmier et al. | | 705/26.8 |

OTHER PUBLICATIONS

Khosrowpour, Mehdi. Dictionary of Information Science and Technology. "Application Program Interface (API)." Hershey, PA: IGI Global, 2007. eBook Collection (EBSCOhost). Web. Feb. 22, 2016.*
Elordi, U., Segura, A., Goenetxea, J., Moreno, A., Arambarri, J., Draft: Virtual Reality Interfaces Applied to Web-Based 3D E-Commerce, Proceedigns of ASME 2012 11th Biennial Conference on Engineering Systems Design and Analysis & Computers and Information in Engineering Conference, Jul. 2-4, 2011, pp. 1-10.*

* cited by examiner

*Primary Examiner* — Resha Desai
*Assistant Examiner* — Lindsey Smith
(74) *Attorney, Agent, or Firm* — James M. Smedley LLC; James Michael Smedley, Esq.

(57) ABSTRACT

The present invention generally relates to web based electronic commerce systems. In particular, embodiments of the invention are directed to systems and methods configured to provide a three dimensional shopping cart for the display of items to be ordered by a user or group of users.

18 Claims, 5 Drawing Sheets

THREE DIMENSIONAL SHOPPING CART

FIELD OF THE INVENTION

The present invention generally relates to web based electronic commerce systems. In particular, embodiments of the invention are directed to systems and methods configured to provide a three dimensional shopping cart for the display of items to be ordered by a user or group of users.

BACKGROUND

Use of electronic commerce (ecommerce) systems is ubiquitous. Shopping over one or more web based systems connected to users through the Internet or other wide area network (WAN) or local area network (LAN) platform is performed by people all over the world, every day. Almost all of these systems rely on catalog style presentation of goods/services which are added to an electronic shopping cart which the user will later confirm and checkout by applying one or more payment methods and providing shipping information for the receipt of their goods/services.

These shopping carts invariably list the items selected by the users in a linear two dimensional manner. In the most common embodiments, the shopping carts provide for a single item per line, potentially with information describing or graphically representing the item along with one or more other pieces of information, such as quantity, size, color and price. Each additional item is added as a new line to the shopping cart.

While these shopping carts, as currently implemented, provide a simple solution to ecommerce checkout processing, they are not always ideal and not always the most intuitive solution for every shopper's needs. For instance, when placing an order for a large group (e.g., a high school athletic division), single line entries may end up taking up several pages or screens to display. Checking entries for correctness in this manner can be difficult. This can be further complicated if the delivery addresses (e.g., different buildings) and shipping times (e.g., for various sports seasons) is different for groups of items contained in the order.

Therefore, there is need in the art for a ecommerce shopping cart system and method that provides easy and intuitive viewing of items to be ordered by a user. These and other features and advantages of the present invention will be explained and will become obvious to one skilled in the art through the summary of the invention that follows.

SUMMARY OF THE INVENTION

Accordingly, it is an aspect of the present invention to provide a system and method for easy and intuitive viewing of items to be ordered by a user. In particular, embodiments of the present invention are directed to providing a three dimensional shopping cart for use in ecommerce and other web-based ordering and shopping systems.

According to an embodiment of the present invention, a web-based system for providing a three dimensional shopping cart for ecommerce transactions includes: an item classification module comprising computer-executable code stored in non-volatile memory; a 3D rendering module comprising computer-executable code stored in non-volatile memory; a communications means comprising computer-executable code stored in non-volatile memory, wherein said item classification module, said 3D rendering module and said communications means are operably connected; and wherein item classification module, said 3D rendering module and communications means are configured to collectively perform the steps of: receiving a rendering request for a 3D shopping cart from a user; identifying one or more items associated with the rendering request; analyzing said one or more items associated with the rendering request for synergies between said one or more items; generating a 3D ordering for said one or more items associated with the rendering request based at least in part on said synergies between said one or more items; and transmitting said 3D ordering to said user.

According to an embodiment of the present invention, the 3D ordering is configured for display in a 3D manner on a computing device of said user.

According to an embodiment of the present invention, the display of said computing device of said user is a 2D display.

According to an embodiment of the present invention, the 3D ordering may be manipulated by said user.

According to an embodiment of the present invention, the manipulation is achieved through the use of one or more filters.

According to an embodiment of the present invention, the manipulation is achieved through the use of electronically recorded gestures.

According to an embodiment of the present invention, the 3D ordering may represent said one or more items associated with a rendering request in a geometric shape.

According to an embodiment of the present invention, a web-based method for providing a three dimensional shopping cart for ecommerce transactions includes the steps of: receiving a rendering request for a 3D shopping cart from a user; identifying one or more items associated with the rendering request; retrieving synergies associated with said one or more items from a data store; generating a 3D ordering for said one or more items associated with the rendering request based at least in part on said synergies between said one or more items; and transmitting said 3D ordering to said user.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to web based electronic commerce systems. In particular, embodiments of the invention are directed to systems and methods configured to provide a three dimensional shopping cart for the display of items to be ordered by a user or group of users.

Figure 1:
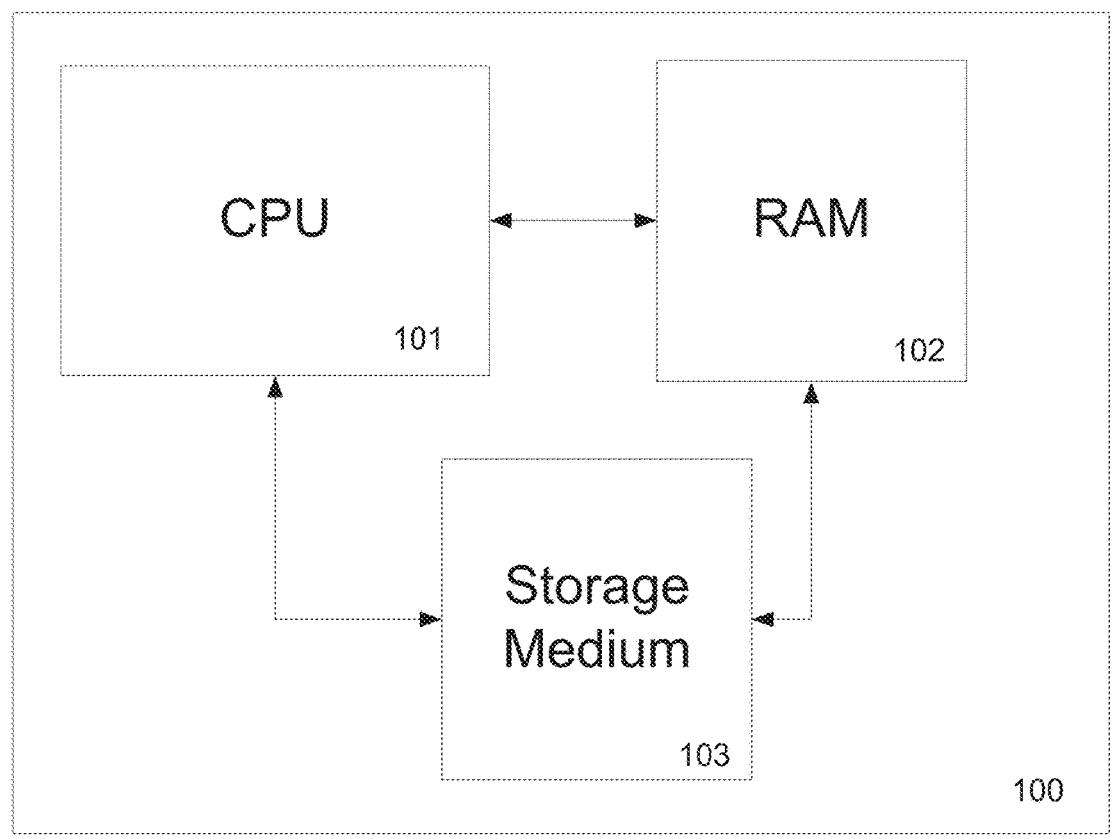
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, and a storage medium (e.g., hard disk drive, solid state drive, flash memory, cloud storage) 103. Examples of computing devices usable with embodiments of the present invention include, but are not limited to, personal computers, smart phones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
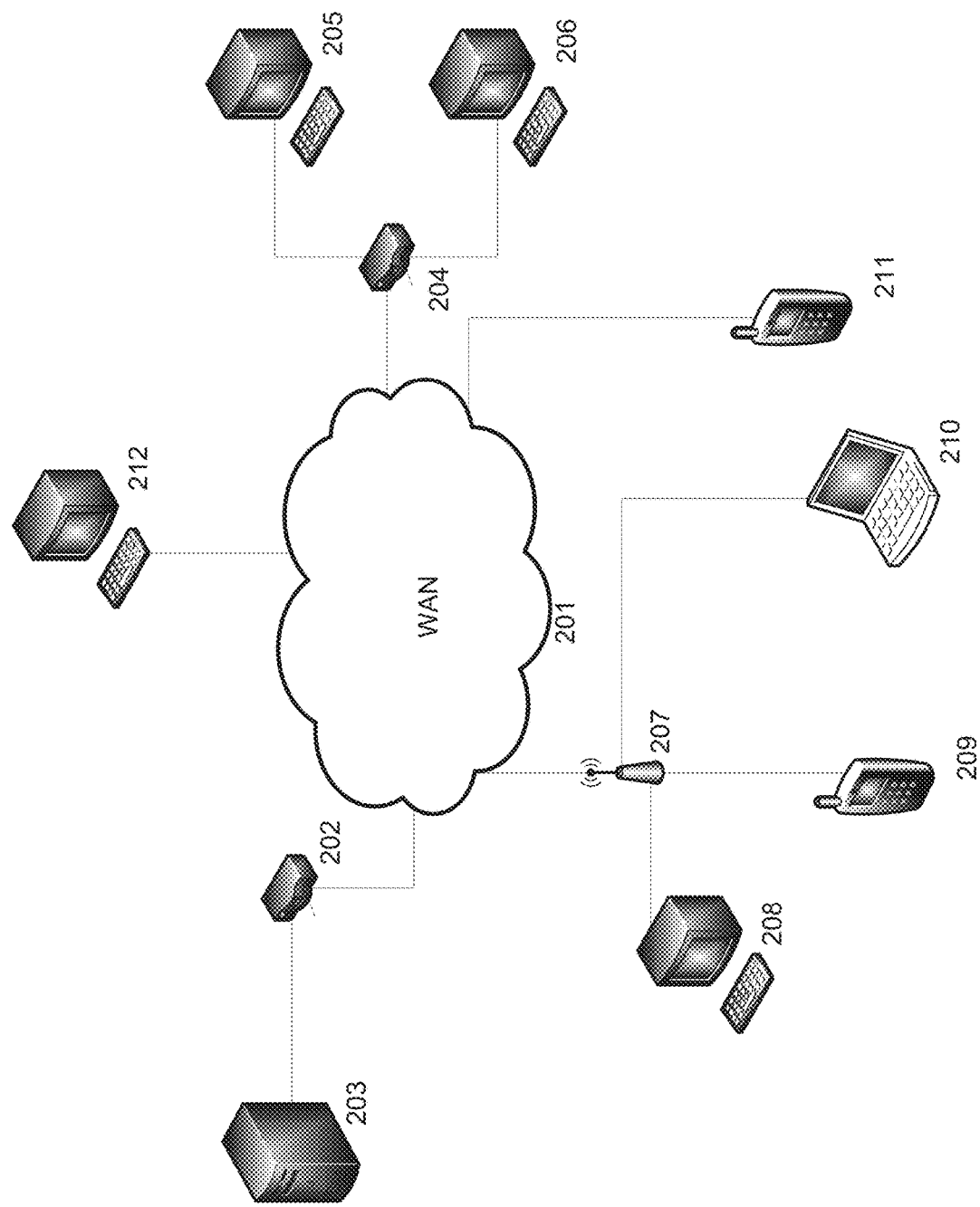
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

According to an embodiment of the present invention, a system and method for providing a three dimensional (3D) shopping cart is described herein. Embodiments of the present invention are configured to provide 3D shopping carts to users for display on a computing device operated by the user. In a preferred embodiment of the present invention, the system is configured to generate a 3D ordering of items associated with a shopping cart or other ordering system.

According to an embodiment of the present invention, the 3D ordering may be comprised of an ordering (i.e., sorting, organizing) of the items to be purchased by the user in a logical manner based on one or more characteristics of the items to be ordered. For instance, the user may be a high school administrator in charge of ordering school uniforms for every sports team for the entire school. In this example, items added to the user's cart could be organized by grade level, color, size, sport or any combination thereof.

In certain embodiments of the present invention, depending on the number of associations/synergies between the various items in the user's shopping cart, the system may be configured to generate 3D orderings based on all the various associations/synergies ("synergies") or any subset thereof. The number of synergies may determine the shape of the 3D rendering outlined in the 3D ordering. For instance, if there are three synergies between all the various items in the user's shopping cart (e.g., size, color, grade level) a cube could be utilized to represent the various synergies in a 3D format with an axis representing a synergy. Fewer or additional synergies may be represented in other geometric shapes. Also, where there are synergies between some of the items, but not all, other geometric shapes could be used in such 3D renderings (e.g., pyramid, cone). For instance, in a pyramid, there may be an item with no synergies (top of the pyramid) and each level of the pyramid below comprising one or more items or groups of items with synergies. In this manner, the system may be configured to provide for 3D renderings of shopping carts with any number of synergies existing between the various items in the shopping cart. One of ordinary skill in the art would appreciate that there are numerous shapes that could be utilized with embodiments of the present invention, and embodiments of the present invention are contemplated for using any shape with the 3D renderings of shopping carts.

Figure 3:
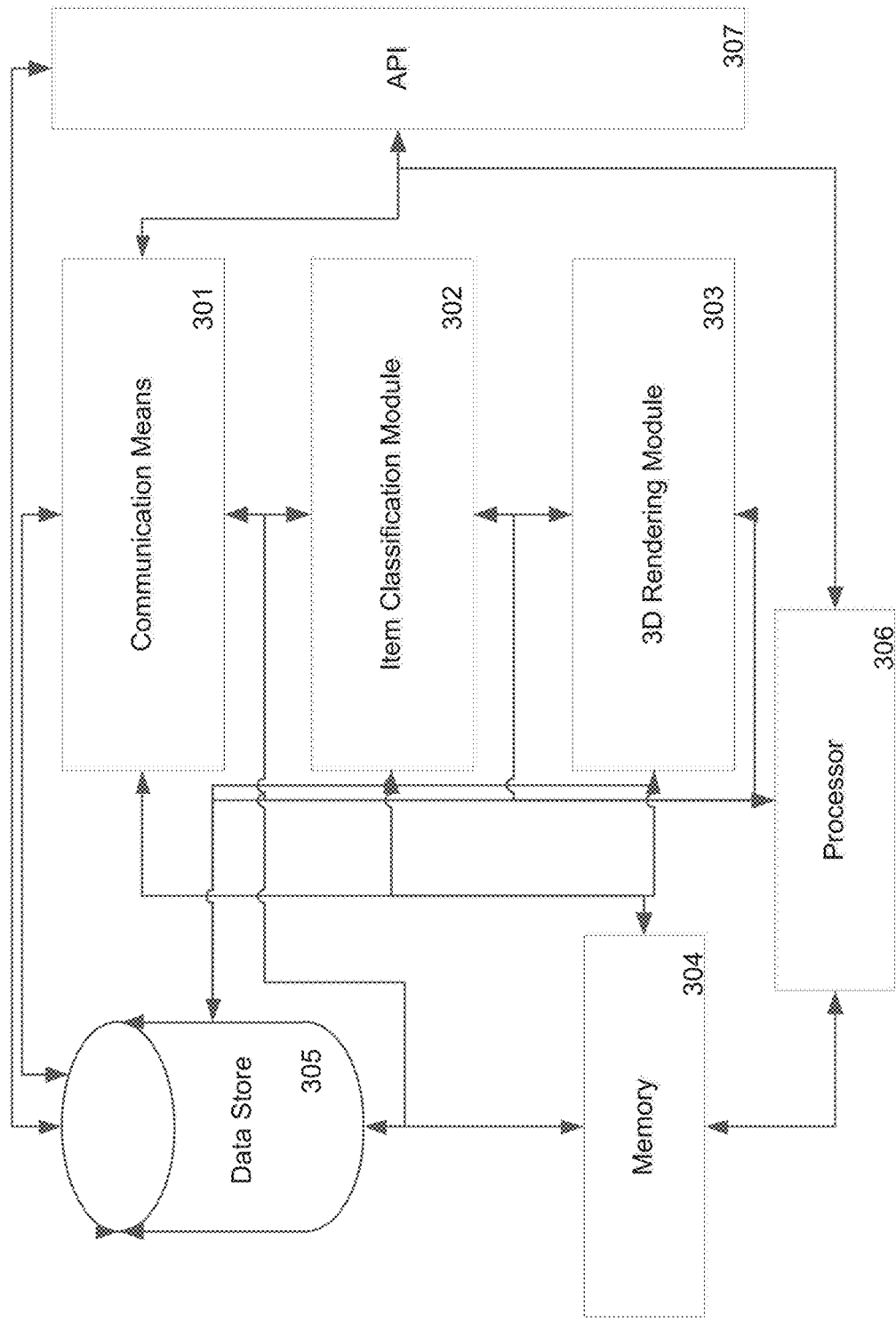
FIG. 3 is a schematic of a system for providing a three dimensional shopping cart, in accordance with an embodiment of the present invention.

Turning now to FIG. 3, an exemplary embodiment of a system for providing 3D shopping carts is shown. In this embodiment, the system includes a communications means 301, an item classification module 302, a 3D rendering module 303, a non-transitory memory module 304, a data store 305, a processor 306 and an application programming interface (API) 307. While the embodiment shown in FIG. 3 is an exemplary embodiment, other embodiments may include additional or fewer components. One of ordinary skill in the art would appreciate that there are numerous configurations of the components that could be utilized with embodiments of the present invention, and embodiments of the present invention are contemplated for use with any configuration of components.

According to an embodiment of the present invention, the item communications means may be, for instance, any means for communicating data over one or more networks. Appropriate communications means may include, but are not limited to, wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

According to an embodiment of the present invention, the item classification module may be comprised of computer-executable code stored in non-transitory memory for use in conjunction with a processor in order to instruct a computer or other computing device to perform actions as described herein. The item classification module is configured to identify characteristics of items listed on an e-commerce system. Characteristics of items may include, but are not limited to, size, color, shape, cut, length, width, height, weight, construction material, safety rating, price or any combination thereof. One of ordinary skill in the art would appreciate that there are numerous types of characteristics that may be identified by the item classification module and utilize in embodiments of the present invention, and embodiments of the present invention are contemplated for use with any type of item characteristics.

According to an embodiment of the present invention, the item classification module may be further configured to identify synergies between one or more items, one or more item characteristics and any combination thereof. Synergies are most commonly formed from shared item characteristics between items in the shopping chart. Simple synergies include parameters associated with a similar item type. For instance, clothing may have simple synergies with regards to color, size, gender, cut, and so forth. Complex synergies may include parameters associated with items of varying types and characteristics. For instance, a computer motherboard with Bluetooth functionality may share a complex synergy with a Bluetooth enabled GPS in that their shared characteristic (e.g., Bluetooth functionality) may overlay their difference in item type. Other examples of complex synergies include cross item type shared item characteristics (e.g., color of a MP3 player with the color of a shirt or other clothing item) and cross item characteristic shared item type (e.g., large umbrella with small umbrella). The system is configured for use with numerous synergies, both simple and complex, and the item classification module is configured to identify such characteristics and item types from various data points provided to the item classification module from one or more data stores, communication means, memory modules, processors, APIs or other component.

According to an embodiment of the present invention, the item classification module may configured to store identified synergies, item characteristics and item types in a data store for later retrieval, comparison, usage or any combination thereof. Data stores may include, but are not limited to, storage mediums, databases and other forms of data stores configured to allow for the storage and retrieval of information.

According to an embodiment of the present invention, the item classification module may be further configured to receive item listings from external e-commerce systems from an API. In this manner, a centralized item classification module can receive item classification requests from third party e-commerce systems or other systems and the item classification module can be configured to process the item classification requests and return to the third party system a confirmation of classification and information regarding item characteristics and synergies.

According to an embodiment of the present invention, the 3D rendering module may be comprised of computer-executable code stored in non-transitory memory for use in conjunction with a processor in order to instruct a computer or other computing device to perform actions as described herein. The 3D rendering module is configured to utilize item characteristics, item types, synergies or any combination thereof, to determine one or more 3D orderings for one or more items in a user's shopping cart. This 3D ordering may then be processed by the user's computing device to display a 3D shopping cart.

In certain embodiments, the 3D rendering module may be located on a computing device, such as a server associated with an e-commerce system. In other embodiments, the 3D rendering module may be located on the user's computing device. In still further embodiments, portions of the 3D rendering module may be located on both a computing device associated with an e-commerce system and a user's computing device. One of ordinary skill in the art would appreciate there are numerous ways to implement a 3D rendering module, and embodiments of the present invention are contemplated for use with any implementation of the 3D rendering module.

According to an embodiment of the present invention, the 3D rendering module may be configured to provide filtering or other sorting characteristics along with the 3D ordering. In this manner, shopping carts with numerous synergies may be filtered or sorted along one or more properties, allowing for simplification of the 3D ordering. For instance, if there are numerous synergies in a 3D ordering (e.g., >5), the resulting 3D shape presented on the user's display could be large or otherwise hard to comprehend. In this case, the user may be able to filter or otherwise sort the 3D ordering on one or more synergy or other filtering characteristic in order to reduce the size of the 3D ordering. When items or synergies are filtered out of the 3D ordering, the displayed shape may become simpler and easier to comprehend. In certain embodiments, filtering may be done directly on the user's computing device. In other embodiments, filtering, ordering or other processing requests may be transmitted to the 3D rendering module or the item classification module for additional processing and 3D ordering.

Figure 4:
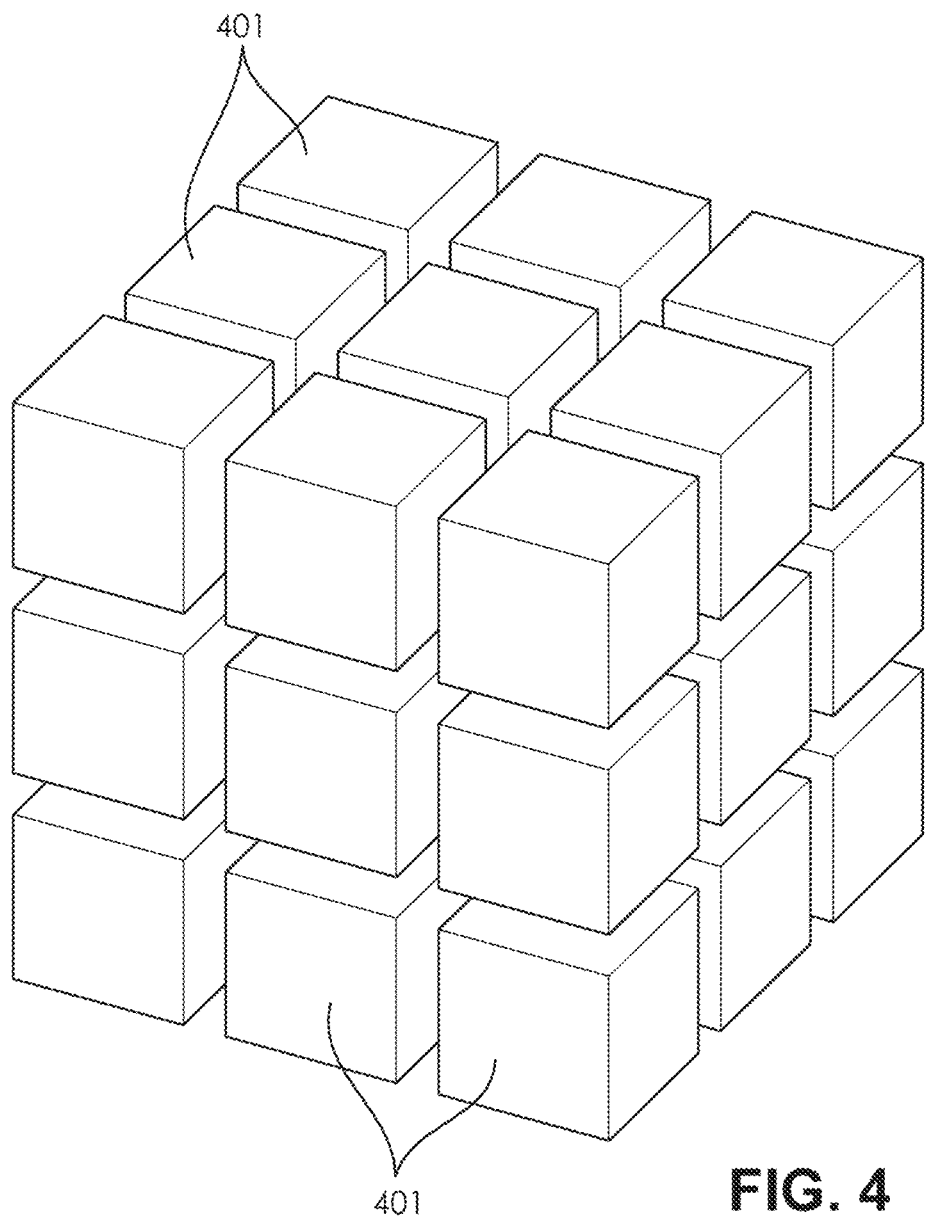
FIG. 4 is an illustration of an exemplary embodiment of a three dimensional shopping cart in accordance with an embodiment of the present invention.

As shown in FIG. 4, in accordance with an exemplary embodiment of the present invention, an exemplary 3D shopping cart, as outlined on a user's display, is shown. In this embodiment, a 3D ordering provided by the system has been rendered as a cube, showing synergies existing between items on 3 axes (i.e., X, Y, Z). Each individual cell 401 represents an item or group of items and each column and row represent one or more synergies between the items in that column or row.

According to an embodiment of the present invention, If a 3D ordering and associated display would result in a perfect geometric shape (such as the cube shown in FIG. 4), but for one or more items, the system may be configured to provide the perfect geometric shape with one or more cells greyed out or otherwise inoperable. In this manner, the system can provide the user with visually appealing 3D shopping carts, even when the items do not share synergies to generate visually appealing shapes.

According to an embodiment of the present invention, once displayed on the user's computing device, the user may manipulate the 3D shopping cart in numerous manners. For instance, the user may click and drag, or other gesture if used on a touch sensitive device or appropriately operable device (e.g., tilting using a computing device with an accelerometer), to move the geometric shape of the 3D shopping cart around to a desired view. Further, the user may be allowed to interact with the 3D shopping cart, by removing items, adding more items or quantity of items, viewing specific groups of items, filtering the 3D shopping cart based on one or more item type, characteristic or synergy.

Once satisfied with the items in their 3D shopping cart, the system may be configured to allow the user to continue to checkout and purchase the desired goods and/or services identified in the 3D shopping cart.

Exemplary Embodiments

Figure 5:
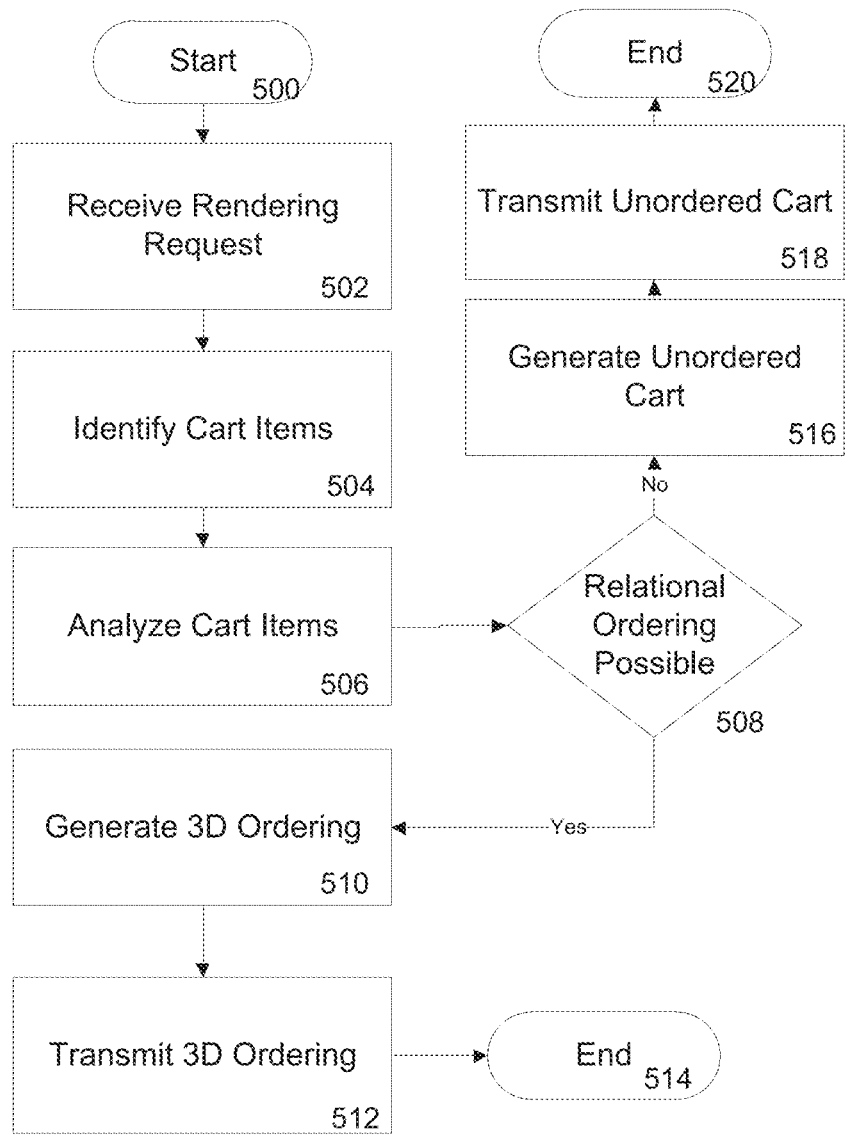
FIG. 5 is a flowchart of an exemplary method in accordance with an embodiment of the present invention.

The following is an exemplary embodiment of a method for providing a 3D shopping cart, as shown in FIG. 5. At step 500, the process starts with a user or third party system (e.g., API) requesting the provision of a 3D shopping cart.

At step 502, the system receives the request for rendering a 3D shopping cart. The request may be comprised of identifiers for various items or information pertaining to items to be classified as well as other information related to the shopping cart (e.g., user information, order information, merchant information).

At step 504, the system identifies the items associated with the rendering request. Each item may be checked for whether the system has previously classified the item (i.e., information stored in one or more data stores) or whether the item is a new item for classification.

At step 506, the system analyzes each item in the cart for synergies, characteristics and type. The system complies all the various synergies and other features and makes a determination as to whether a 3D rendering is possible given the items in the cart (step 508).

If 3D rendering (relational ordering) is possible, the system proceeds to step 510 where the system generates the 3D ordering for the items in the shopping cart. The system may be configured to provide one or more 3D ordering, depending on the number of items, number of synergies and other information provided by the user.

At step 512, the system transmits the 3D ordering to the user or other third party system and the process terminates at step 514.

If 3D rendering (relational ordering) is not possible, the system proceeds to step 516 where the system generates an unordered cart. An unordered cart may be much like a standard shopping cart or it may be a linear or other simplistic 3D shopping cart where no ordering or synergies are provided.

At step 518, the system transmits the unordered cart to the user or third party system and the process terminates at step 514.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computer implemented method of purchasing quantities of items using a 3D shopping cart, said method comprising:
   receiving, by said computer, a listing of items selected for possible purchase from one or more external e-commerce systems through an API;

identifying, by said computer, characteristics of each item in said item listing based on data points acquired for each item from one or more data stores;

identifying, by said computer, an item type for each item based on said data points;

identifying, by said computer, shared characteristics among a plurality of said items;

generating, by said computer, a 3D ordering of said plurality of items, wherein said items in said 3D ordering are visually arranged according to said identified item type and said identified shared characteristics of said items, thereby forming a 3D shopping cart, wherein the 3D ordering has a 3D shape defined, at least in part, by the number of said identified shared characteristics among said items, such that the shape has a number of axes corresponding to the number of identified shared characteristics, wherein the 3D shopping cart comprises a plurality of constituent cells, wherein each cell represents an item or group of items and each column and row of cells in the 3D shopping cart represents a synergy between the items in the respective column or row;

displaying, by a display screen of said computer, the 3D shopping cart; and transmitting, by said computer, said 3D shopping cart to said one or more external e-commerce systems allowing a user to checkout and purchase items in the 3D shopping cart from said one or more external e-commerce systems.

2. The computer implemented method of claim 1 wherein said identified shared characteristics are selected from a group consisting of: size, color, shape, cut, length, width, height, weight, construction material, safety rating, price or any combination thereof.

3. The computer implemented method of claim 1, wherein said identified shared characteristics, said identified item characteristics, and said identified item types are stored in a data store.

4. The computer implemented method of claim 1, further comprising:

receiving, by said computer, item classification requests from said one or more external e-commerce systems;

processing, by said computer, said requests; and transmitting, by said computer to said one or more external e-commerce systems, a confirmation of classification and information regarding said identified item characteristics and said identified shared characteristics.

5. The computer implemented method of claim 1, further comprising filtering out said identified characteristics or said identified shared characteristics in order to simplify at least one of a size and said shape of the 3D ordering.

6. The computer implemented method of claim 1, further comprising the step of changing said shape generated for said 3D shopping cart to a perfect geometric shape.

7. The computer implemented method of claim 1, further comprising the step of tilting the 3D shopping cart on said display screen of said computer in response to a signal from an accelerometer of said computer in order to move the 3D shopping cart to a desired view.

8. The computer implemented method of claim 1, wherein one or more of said items can be removed from the 3D shopping cart and one or more of said items can be added to the 3D shopping cart.

9. The computer implemented method of claim 1, wherein said user can view a specific group of items in the 3D shopping cart by filtering the 3D shopping cart based on at least one of: item type, item characteristic, and shared characteristics.

10. A non-transitory computer-readable medium having processor-executable instructions stored thereon that, when executed by a processor operably connected to one or more data stores cause the processor to:

receive a listing of items selected for possible purchase from one or more external e-commerce systems through an API;

identify characteristics of each item in said item listing based on data points acquired for each item from said one or more data stores;

identify an item type for each item based on said data points;

identify shared characteristics among a plurality of said items;

generate a 3D ordering of said plurality of items, wherein said items in said 3D ordering are visually arranged according to said identified item type and said identified shared characteristics of said items, thereby forming a 3D shopping cart, wherein the 3D ordering has a 3D shape defined, at least in part, by the number of said identified shared characteristics among said items, such that the shape has a number of axes corresponding to the number of identified shared characteristics, wherein the 3D shopping cart comprises a plurality of constituent cells, wherein each cell represents an item or group of items and each column and row of cells in the 3D shopping cart represents a synergy between the items in the respective column or row;

display the 3D shopping cart; and transmit said 3D shopping cart to said one or more external e-commerce systems allowing a user to checkout and purchase items in the 3D shopping cart from said one or more external e-commerce systems.

11. The computer-readable medium of claim 10, wherein said identified shared characteristics are selected from a group consisting of: size, color, shape, cut, length, width, height, weight, construction material, safety rating, price or any combination thereof.

12. The computer-readable medium of claim 10, wherein said identified shared characteristics, said identified item characteristics, and said identified item types are stored in said one or more data stores.

13. The computer-readable medium of claim 10, having further processor-executable instructions stored thereon that cause the processor to:

receive item classification requests from said one or more external e-commerce systems;

process said requests; and transmit to said one or more external e-commerce systems a confirmation of classification and information regarding said identified item characteristics and said identified shared characteristics.

14. The computer-readable medium of claim 10, having further processor-executable instructions stored thereon that cause the processor to filter out said identified characteristics or said identified shared characteristics in order to simplify at least one of the size and shape of the 3D ordering.

15. The computer-readable medium of claim 10, having further processor-executable instructions stored thereon that cause the processor to change the shape generated for said 3D shopping cart to a perfect geometric shape.

16. The computer-readable medium of claim 10, having further processor-executable instructions stored thereon that cause the processor to tilt the 3D shopping cart on said display in response to a signal from an accelerometer of a computer in order to move the 3D shopping cart to a desired view.

17. The computer-readable medium of claim 10, wherein one or more of said items can be removed from the 3D shopping cart and one or more of said items can be added to the 3D shopping cart.

18. The computer-readable medium of claim 10, wherein said user can view a specific group of items in the 3D shopping cart by filtering the 3D shopping cart based on at least one of: item type, item characteristic, and shared characteristics.

* * * * *